United States Patent
Spangle et al.

(10) Patent No.: US 7,670,994 B1
(45) Date of Patent: Mar. 2, 2010

(54) METHOD FOR TREATING OIL AND GAS WELLS

(75) Inventors: Lloyd Byron Spangle, Claremore, OK (US); Allen A. Pence, Owasso, OK (US)

(73) Assignee: Catalyst Partners, Inc., Chico, TX (US)

( * ) Notice: Subject to any disclaimer, the term of this patent is extended or adjusted under 35 U.S.C. 154(b) by 13 days.

(21) Appl. No.: 12/019,933

(22) Filed: Jan. 25, 2008

Related U.S. Application Data

(60) Provisional application No. 60/934,370, filed on Jun. 13, 2007.

(51) Int. Cl.
*C09K 8/588* (2006.01)
*C08L 29/00* (2006.01)

(52) U.S. Cl. .................. 507/221; 507/273; 525/231; 525/337

(58) Field of Classification Search .................. 507/221, 507/273; 525/231, 337
See application file for complete search history.

(56) References Cited

U.S. PATENT DOCUMENTS

| | | | |
|---|---|---|---|
| 3,411,580 A * | 11/1968 | Roberts et al. .............. 166/285 |
| 3,437,141 A * | 4/1969 | Brandner et al. .......... 166/270.1 |
| 3,866,683 A * | 2/1975 | Maly et al. .................. 166/292 |
| 4,196,777 A * | 4/1980 | Kalfoglou ................ 166/270.1 |
| 4,515,216 A * | 5/1985 | Childs et al. ................ 166/293 |
| 5,009,269 A | 4/1991 | Moran et al. | |

* cited by examiner

*Primary Examiner*—Timothy J. Kugel
(74) *Attorney, Agent, or Firm*—William P. Ramey, III

(57) ABSTRACT

A two step process for treating an oil or gas well. The first step uses a cross linking agent, such as borax, as a preliminary wash for the well following drilling. The cross linking agent cleans the well of excess mud and pre-coats the tubing and the formation surfaces with the cross linking agent. The second step introduces a cement-polymer mixture into the well. A polymer, such as for example polyvinyl alcohol, that undergoes cross linking when exposed to the cross linking agent is employed. When the polymer comes into contact with the cross linking agent in the well, cross linking of the polymer occurs. This cross linking helps to prevent fluid loss into the formation. Also, because the cross linking agent wash previously cleaned the surfaces of the tubing and the formation, better bonding between the cement and the surfaces of the tubing and the formation occurs.

7 Claims, No Drawings

METHOD FOR TREATING OIL AND GAS WELLS

CROSS-REFERENCE TO RELATED APPLICATIONS

The present application claims priority to U.S. Provisional Patent Application No. 60/934,370 filed on Jun. 13, 2007.

BACKGROUND OF THE INVENTION

1. Field of the Invention

The present invention relates to a method for treating oil and gas wells. More specifically, the present method serves to clean the bore hole of the well of excess mud prior to cementing and assists in fluid loss control during the cementing process. Because the method cleans the well of excess mud, this allows for improved bonding of the cement to the pipe and to the formation.

2. Description of the Related Art

Previous methods of fluid loss control have been attempted by a one step addition of fluid loss control additive to the cement, which hopefully reduces the ability of the liquid portion of the slurry from rapidly penetrating a permeable zone at the formation face. This creates a critical dependence of the fluid control on the use of a fluid loss control additive that functions at the temperature of the permeable zone. Also, the cement slurry must be designed to complement the requirements of the fluid loss additive for rheology of the fluid portion of the cement slurry. Most fluid loss control additives thicken the cement slurry into which they are mixed. Also, they may retard the hardening of the cement when it reaches its required destination. To deal with such properties, it is common for service companies to have many different fluid loss control additives and to select the "best fit" for the well conditions that are to be encountered.

The current invention is a composition and method that uses a two stage process to allow the use of one cross linking agent composition which can function as a pre wash and "seeding" of the permeable zone of the formation face, and a second or follow up composition which can be the actual cement slurry which contains the reactive polymer composition. This method is not as temperature dependant as most fluid loss additives, but can function from near freezing, i.e. near 32 degrees F., to above 300 degrees F.

A cross linking agent is to be used as a pre wash or as a "spacer" additive or drilling mud additive which is non toxic and environmentally clean. As a chemical wash, the cost is very low compared to complex chemical washes. The cross linking agent can be formulated as a non thickened water base fluid that will allow turbulent flow in the annulus at very low pump rates. The turbulent flow has been observed in laboratory simulations that show the churning action that occurs at the front of the injected wash. The detergent action of the cross linking agent together with the turbulent flow will granulate the excess mud adhering to the pipe and the loose mud at the formation face and carry the material out of the well. During this cleaning action, a "seeding" will take place at the formation face which impregnates the mud cake with cross linking agent chemical. The concentration will vary depending on the permeability at the formation face; the higher concentration going into the more permeable zones.

The cross linking agent can also be used in drilling mud or "spacers" to be available when later injection of polymer takes places. Thus fluid loss control could be obtained without the necessity of the cross linking agent wash, which in certain circumstances might not be desired. There is the possibility that a wash is not always an option if disposal of fluids is a problem.

The polymer can be added to the cement mixture as a dry or liquid fluid loss control additive that requires a cross linking agent wash to be used ahead or to be used when the drilling mud or "spacer" has previously carried the cross linking agent. The polymer is also very low in cost compared to complex fluid loss control additives and requires an order of magnitude less material than conventional additives. This is primarily the result of the permeability block occurring at the formation cement interface where the reaction of the polymer and cross linking agent takes place. If the reaction had taken place in the cement slurry prior to reaching the permeable formation, the slurry would be much thicker and usually would have to contain more water to reduce the viscosity of the reacted chemicals. Concentrating the reaction at the pressure differential interface means that cement slurry doesn't have to carry materials which can cause excessive viscosity or otherwise excessive amount of fluid loss control material. This frees the slurry designer from the excess viscosity of most fluid loss control methods. Testing at the low temperatures has shown fluid loss control with less than 0.1 percent fluid loss control additive in the cement slurry, whereas a one stage fluid loss test using conventional methods and materials requires 1 percent or more.

This two stage method and also the type of chemicals used in the method should be a significant improvement for fluid loss prevention and permeable interface sealing. Such a technique or method could be utilized in any type of permeable situation to minimize leak off of fluid from a well bore, pond, lake, dam, etc.

SUMMARY OF THE INVENTION

The present invention is a method for treating an oil or gas well and uses a cross linking agent, such as borax, as a preliminary wash for the well following drilling. This preliminary wash cleans the well of excess mud and pre-coats the tubing and the formation surfaces with the cross linking agent. Next, the cement polymer mixture is pumped into the well. A polymer, such as for example polyvinyl alcohol, that undergoes cross linking when exposed to the cross linking agent is employed for this purpose. When the polymer comes into contact with the cross linking agent, the polymer undergoes polymerization or cross linking. This cross linking helps to prevent fluid loss into the formation. Also, because the cross linking agent wash previously cleaned the surfaces of the tubing and the formation, this results in better bonding between the cement and the surfaces of the tubing and the formation.

DETAILED DESCRIPTION OF THE PREFERRED EMBODIMENT

The present invention is a method for treating an oil or gas well and uses a cross linking agent, such as borax, as a preliminary wash for the well. In other embodiments, the cross linking agent can be selected from the group consisting of borax (i.e., sodium borates), boric acid, water soluble borates, calcium borates, potassium borates, titanates, zirconates, and mixtures thereof. This preliminary wash cleans the well and pre-coats the tubing and the formation surfaces with the cross linking agent. Next, the cement with polymer is pumped into the well. When the polymer comes into contact with the cross linking agent, the polymer undergoes polymerization or cross linking. This cross linking helps to prevent fluid loss into the formation. Also, because the cross linking agent wash cleaned the surfaces of the tubing and the formation, this results in better bonding between the cement and the surfaces of the tubing and the formation.

This invention has been proven using borax as a common cross linker for polyvinyl alcohol (PVA) as the polymer by Applicants in the laboratory. A non-limiting example of a suitable polymer for the present invention is a low viscosity partially hydrolyzed polyvinyl alcohol, such as DuPont Elvanol® 51-0588. Other polymers may also be used in additional embodiments. These materials have been used before as fluid loss control agents, but only as a combined one step package. When used as a pre-blended or combined fluid loss control agent, the reaction of cross linking occurs in the cement slurry at the initial mixing time when water is added to the dry cement materials. As a result of this reaction in the early slurry life, the cross linking reaction creates a fragile structure that is temperature limited to about 200 degrees F. and requires a great excess of fluid loss material to control the fluid loss. Also the early reaction creates an increase in viscosity and possible gelatin of the slurry. Such rheology problems increase the demands on pumping equipment and change the desired state of turbulent flow to plug flow or laminar flow. Turbulent flow is an accepted method to increase mud removal and subsequent bond improvement.

The addition of fine particulate material, such as for example calcium carbonate, which has been ground or precipitated to less than 50 micron in average diameter, to the polyvinyl alcohol prior to mixing it with the cement will be beneficial. These particles are carried by the polyvinyl alcohol as it begins to soften in the aqueous slurry and can contribute to the plugging action of the permeable formation. The addition of fine particulate material which is initially non-reactive in the early reaction of cement hydration by has a surface binding to the polyvinyl alcohol to carry by a gluing action the solid particles which help to crate the "plug" for fluid loss prevention. The Portland cement particles cannot usually function in this manner since upon hydration, the surface of the cement goes into solution in a "sloughing" action. Also, this is considerably more important if the particular cement slurry formulation has high gel strength properties. Such a gelled slurry will usually not allow the cement grains to move the desired fluid loss plug area.

Applicants have documented using borax as a pre-wash and primer for cross linking a following polyvinyl alcohol in testing done in accordance with American Petroleum Institute procedures as outlined in API RP 10 publication. Variation from the strict test procedures were done in regard to simulation of a mud cake formation face as the permeable interface for fluid loss tests. The standard filter medium was 3.5 sq. in. in area. A 45 mm screen (No. 325) was supported by a 250 mm screen (No. 60). In order to simulate a mud covered formation face, the tests were conducted by sandwiching a 1/16 smear of thick bentonite mud between Whatman No. 1 qualitative filter paper. The mud was soaked with 2 ml of a solution containing 0.2 grams of borax. This "mud sandwich" was placed on the standard screen and fluid loss tests were conducted as outline in the API procedures. To verify the improved control of the invention, tests were run using the "mud sandwich" without borax and without the following polyvinyl alcohol.

Tests show that the polyvinyl alcohol can be reduced to less than 0.1 percent by weight of dry cement and still maintain excellent fluid loss control at the low temperatures. The conventional pre-cross linked method uses as much as 10 times as much fluid loss additive. Temperature limits easily were above the 200 degrees F. limit of the conventional technique and were in fact found to extend to the break down temperature of the polyvinyl alcohol which is above 300 degrees F. for the particular polyvinyl alcohol tested. It is believed that the temperature could exceed this for a material with higher temperature stability.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A method for treating oil and gas wells, wherein the oil and gas wells comprise a tubing surface and a formation surface, and wherein the method comprises:
    pre-treating a well with a cross linking agent, wherein the pre-treatment cleans the well of excess mud and pre-coats the tubing and the formation surfaces with the cross linking agent; and
    adding a polymer to the well, wherein the polymer is added to the well with a cement mixture, wherein the polymer undergoes polymerization or cross-linking when exposed to the cross linking agent, and wherein the polymerization helps prevent fluid loss into the formation.

2. A method for treating oil and gas wells according to claim 1, wherein the method further comprises adding a fine particulate material to the polymer prior to adding the polymer to the well with the cement mixture.

3. A method for treating oil and gas wells according to claim 2, wherein the fine particulate material is calcium carbonate.

4. A method for treating oil and gas wells according to claim 1, wherein the cross linking agent is added to the well as a preliminary wash following drilling.

5. A method for treating oil and gas wells according to claim 1, wherein the cross linking agent is added to the well along with oil-based drilling mud.

6. A method for treating oil and gas wells according to claim 1, wherein the cross linking agent is selected from the group consisting of borax, boric acid, water soluble borates, calcium borates, potassium borates, titanates, zirconates, and mixtures thereof.

7. A method for treating oil and gas wells according to claim 1, wherein the polymer is a polyvinyl alcohol.

* * * * *